(12) United States Patent
Zwarico et al.

(10) Patent No.: US 8,683,034 B2
(45) Date of Patent: Mar. 25, 2014

(54) SYSTEMS, METHODS AND COMPUTER PROGRAM PRODUCTS FOR COORDINATED SESSION TERMINATION IN AN IMS NETWORK

(75) Inventors: Amy Zwarico, Mountain Brook, AL (US); Loraine Beyer, Hoover, AL (US); Kevin Castellow, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 650 days.

(21) Appl. No.: 11/865,934

(22) Filed: Oct. 2, 2007

(65) Prior Publication Data

US 2009/0089425 A1    Apr. 2, 2009

(51) Int. Cl.
*G06F 15/173* (2006.01)
*G01R 31/08* (2006.01)
*H04L 12/26* (2006.01)
*H04M 1/66* (2006.01)

(52) U.S. Cl.
USPC ........... 709/224; 709/227; 370/231; 370/242; 455/411

(58) Field of Classification Search
USPC ........................................ 709/224
See application file for complete search history.

(56) References Cited

U.S. PATENT DOCUMENTS

| | | | |
|---|---|---|---|
| 8,005,457 B2* | 8/2011 | Jones | 455/406 |
| 2005/0246548 A1 | 11/2005 | Laitinen | |
| 2006/0085546 A1* | 4/2006 | Abdo et al. | 709/227 |
| 2006/0146798 A1* | 7/2006 | Harton et al. | 370/352 |
| 2007/0019670 A1* | 1/2007 | Falardeau | 370/465 |
| 2007/0167151 A1* | 7/2007 | Zinn et al. | 455/411 |
| 2007/0233896 A1* | 10/2007 | Hilt et al. | 709/238 |
| 2008/0043726 A1* | 2/2008 | Herrero-Veron et al. | 370/352 |
| 2008/0123603 A1* | 5/2008 | Cai et al. | 370/338 |
| 2008/0307518 A1* | 12/2008 | Holtmanns et al. | 726/12 |

OTHER PUBLICATIONS

3GPP TS 33.220 V8.0.0 (Jun. 2007), 3$^{rd}$ Generation Partnership Project; Technical Specification Group Services and System Aspects; Generic Authentication Architecture (GAA); Generic bootstrapping architecture (Release 8), 75 pgs.
3GPP TR 33.919 V7.2.0 (Mar. 2007), 3$^{rd}$ Generation Partnership Project; Technical Specification Group Services and System Aspects; 3G Security; Generic Authentication Architecture (GAA); System description (Release 7), 17 pgs.

* cited by examiner

*Primary Examiner* — Shaq Taha
(74) *Attorney, Agent, or Firm* — Myers Bigel Sibley & Sajovec, P.A.

(57) ABSTRACT

A network connectivity status of user equipment (UE) is detected. Detection of the network connectivity status of the UE may include, for example, detecting termination of network connectivity of the UE responsive to a communication to the network by the UE, receiving a termination message from the UE at the bootstrapping server function (BSF), receiving notification of de-registration of the UE from a home subscriber server (HSS) and/or detecting a loss of communications between the UE and the network. A bootstrapping server function (BSF) communicates with at least one network application function (NAF) responsive to detection of the network connectivity status to terminate a plurality of sessions associated with the UE.

6 Claims, 6 Drawing Sheets

SYSTEMS, METHODS AND COMPUTER PROGRAM PRODUCTS FOR COORDINATED SESSION TERMINATION IN AN IMS NETWORK

BACKGROUND OF THE INVENTION

The present invention relates generally to communication networks and, more particularly, to delivering services via communication networks.

The Internet Protocol (IP) Multimedia Subsystem (IMS) is a standard that has been developed to define the control and integration of multimedia services in a core, packet-switched network. In particular, the IMS architecture defines a set of logical functions that use a signaling protocol known as the session initiation protocol (SIP) to establish communication sessions in an IP network. A "session" may be, for example, a one-to-one voice call or a more complex interaction, such as a one-to-many conference call involving multimedia services. SIP may also be used to facilitate voice over IP (VoIP) services, in which voice is transported in IP data packets that are re-assembled and converted into an audio signal for the recipient. IMS may be characterized as a standardized way to connect IP devices and networks using SIP.

Figure 1:
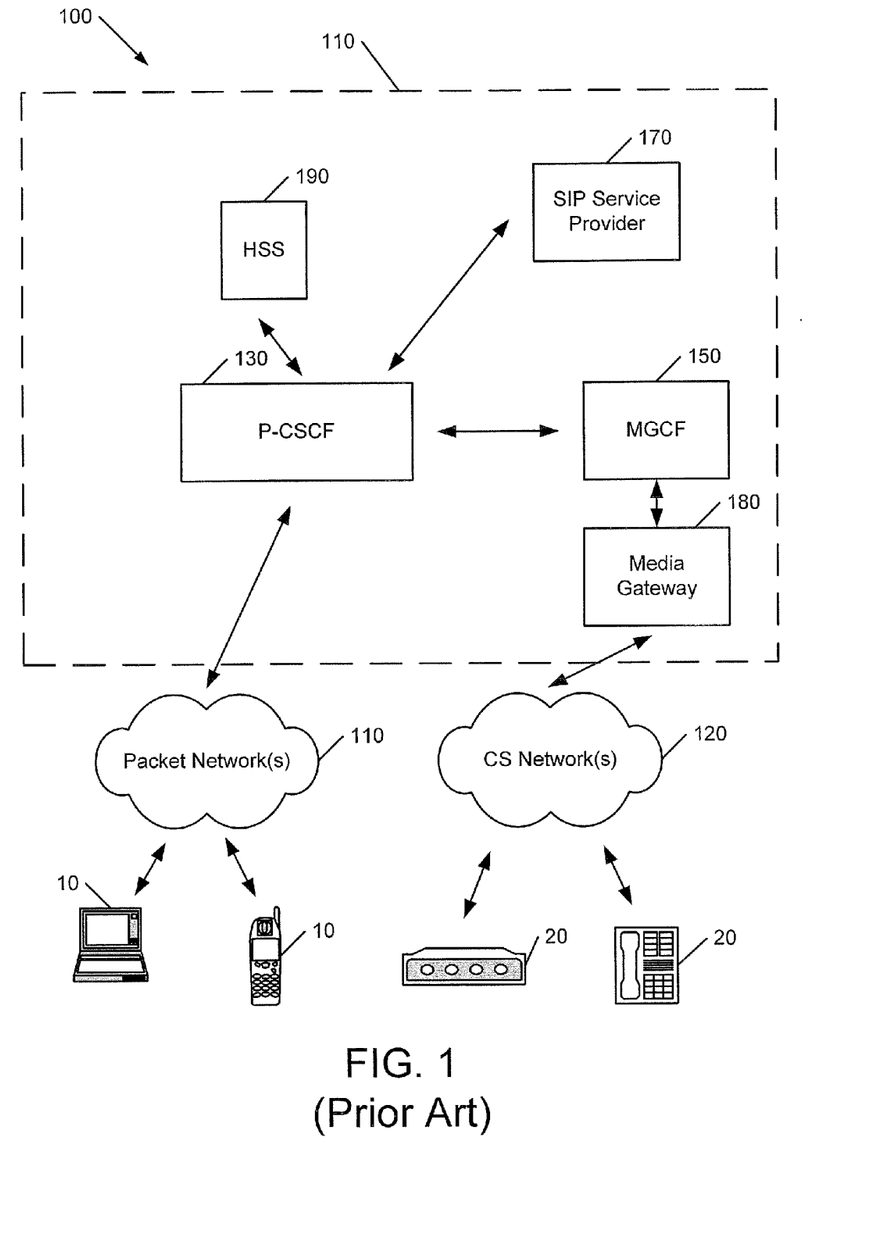
FIG. 1 is a schematic diagram illustrating a conventional Internet Protocol (IP) Multimedia Subsystem (IMS) network.

Referring to FIG. 1, an exemplary communication network 100 includes an IMS network 105 that is coupled to packet switching network(s) 110 and circuit switched network(s) 120, which may provide connectivity to the IMS network 105 for devices 10, 20, such as cell phones, WiFi-equipped computing devices, conventional telephones, modems, and other devices. A device may connect to the IMS network 105 using any of a number of different interfaces, generally depending on the nature of the device. The devices 10, 20 may include IP devices that are capable of communicating via SIP.

The IMS network 105 includes apparatus configured to provide a variety of different functions linked by standardized interfaces. Generally, functions of the IMS network 105 include a bundle of functions of SIP servers or proxies, collectively referred to as a Call Session Control Function (CSCF), which are used to process SIP signaling packets in the IMS network 105. Functions of the CSCF may include: registration of devices with the IMS network 105; routing and inspection of signaling messages; authentication of users and establishment of security associations; compression, decompression and other signal processing functions; authorization of resources; policy enforcement; bandwidth management; and generation of charging records. These functions may be apportioned among several call session control function proxies or servers, such as a Proxy-CSCF(P-CSCF) 130, Media Gateway Control Function (MGCF) 150, Interrogating-CSCF (I-CSCF), Serving-CSCF (S-CSCF), and various other functions, gateways and the like.

The P-CSCF 130 may be configured as a SIP proxy to function as an interface to the IMS network 105 for IP terminals/devices 10, 20. The P-CSCF 130 may enable the registration of IP terminals/devices and the routing of SIP and/or HTTP signaling messages between the devices 10, 20 and service providers, such as the SIP Service Provider 170. The P-CSCF 130 may communicate with devices 10 via the packet network(s) 110 and may communicate with devices 20 via MGCF 150, a media gateway 180, and circuit switched network(s) 120. The MGCF 150 may enable SIP signaling to inter-work with other types of signaling used by the media gateway 180. Thus, the combination of the MGCF 150 and the media gateway 180 may provide an interface between the SIP signaling used in the IMS network 105 and the signaling used in the circuit switched network(s) 120.

A Home Subscriber Server (HSS) database 190 may maintain a service profile and other information for each end-user and associated IP terminal/device that has registered with the IMS network 105. The profile and other information may include, but is not limited to, IP address information, roaming information, and/or telephony services information.

The devices 10 and/or 20 may desire to access a Web or browser based service. A Web Service is a reusable piece of software that interacts by exchanging messages over a network. Commonly, Web Services use Simple Object Access Protocol (SOAP), a protocol for exchanging XML-based messages. A common messaging pattern in SOAP is the Remote Procedure Call (RPC) pattern, in which a Web Service requester sends a request message to a Web Service Provider, and the Web Service Provider sends a response message that provides the requested service, for example, the result of applying a particular procedure based on parameters passed in the Web Service request.

Generally, it is desirable that a Web Service have some type of authentication capability, such that unauthorized access to the service may be prevented. A variety of different authentication techniques may be used for Web Services, including transmission of credentials to the Web Service Provider with or without encryption, digest techniques in which credentials may be hashed on the client and server and the results compared, and third party certificate approaches wherein a user requests and installs a certificate from a trusted third party (e.g., Verisign, Entrust, etc.), and the Web Service Provider can query the third party to verify credentials as required.

The Internet Protocol (IP) Multimedia Subsystem (IMS) allows devices to authenticate within the SIP domain using the HTTP Digest Authentication and Key Agreement (AKA) protocol. This level of authentication, i.e., device level of authentication, may be extended to the Web (HTTP) domain via the Generic Authentication Architecture (GAA) and the Generic Bootstrapping Architecture (GBA), which are described in the 3GPP Technical Specifications 3GPP TS 33.919 and TS 33.220

Figure 2:
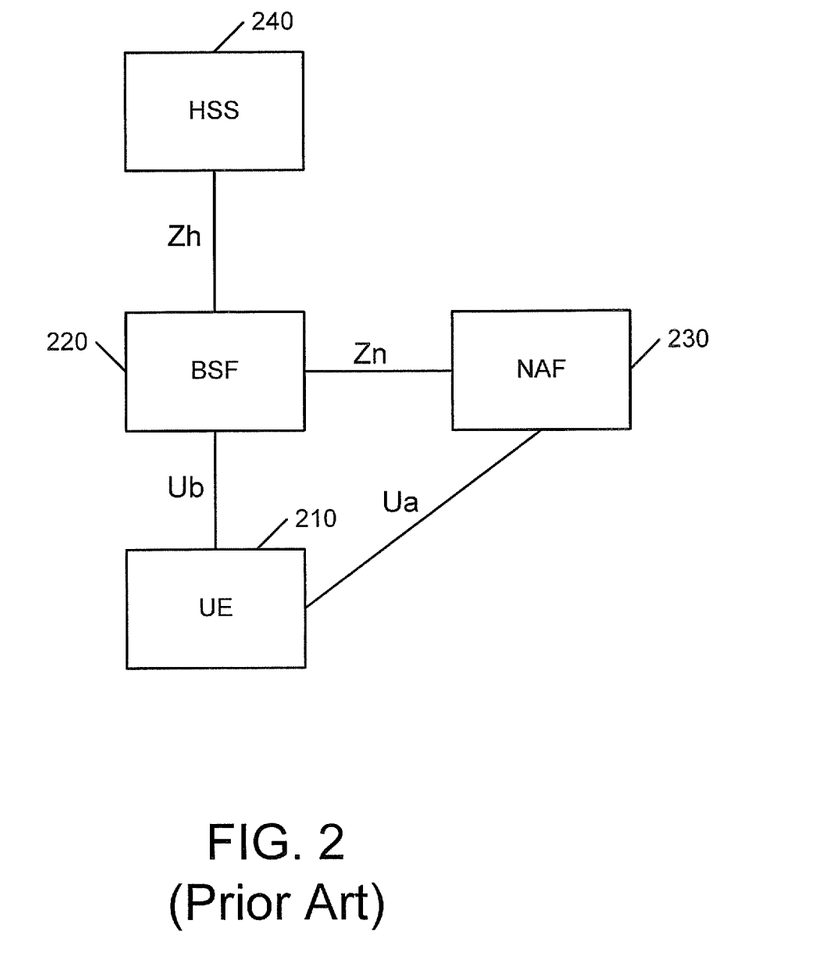
FIG. 2 is a schematic diagram illustrating a conventional 3GPP bootstrapping architecture.

FIG. 2 illustrates a network employing a conventional GBA. The network includes a Bootstrapping Server Function (BSF) 220, a Network Application Function (NAF) 230, and a Home Subscriber System (HSS) 240. User Equipment (UE) 210 is configured to communicate with these components. The U E 210 may include the hardware and/or software to support the HTTP Digest AKA protocol and any communication protocols that are used for communicating with the various NAFs in the network. The UE 210 may contain a Universal Integrated Circuit Card (UICC), which contains the software and data for authenticating the UE 210 in an IMS network so that the UE establishes an IMS Public Identity (IMPU), which is registered in the HSS 240.

The BSF 220 may be included in a network element that is managed by a network operator. The BSF 220, HSS 240, and UE 210 participate in the GBA authentication protocol in which shared key material is shared between the UE 210 and the network by running the bootstrapping procedure. For example, the BSF 220 may authenticate the UE 210 using the AKA protocol. The key information established during this device authentication procedure can then be used by the UE 210 when accessing the NAF 230. The BSF 220 may restrict the lifetime of the key material and may also restrict the applicability of the key particular to particular NAFs by using a key derivation procedure.

The NAF 230 may provide one or more services to the UE 210 and may also communicate securely with the BSF 220. A NAF may also be referred to as an Application Server (AS). The HSS 240 maintains a service profile and other information for each UE that has registered with the network. The profile and other information may include, but is not limited to, IP address information, roaming information, and/or telephony services information.

The interface Ua specifies the application protocol between the UE 210 and the NAF 230, which is secured based on the shared key material obtained from running the AKA protocol to authenticate the UE 210. The interface Ub specifies the protocol mutually authenticating the UE 210 and the BSF 220. To authenticate the UE 210, the 3GPP AKA protocol may be used. The interface Zn specifies the protocol used by the NAF 230 to obtain key material agreed to between the UE 210 and BSF 220 in authenticating the UE 210, and used to obtain authenticated identity information associated with a user of the UE 210 from the BSF 220. The interface Zh specifies the protocol that the BSF 220 and HSS 240 use to communicate authentication information for the UE 210.

SUMMARY

According to exemplary embodiments methods of operating an IMS network are provided. A network connectivity status of User Equipment (UE) is detected. Detection of the network connectivity status of the UE may include, for example, detecting termination of network connectivity of the UE responsive to a communication to the network by the UE, receiving a termination message from the UE at the BSF, receiving notification of de-registration of the UE from a Home Subscriber Server (HSS) and/or detecting a loss of communications between the UE and the network. A Bootstrapping Server Function (BSF) communicates with at least one Network Application Function (NAF) responsive to detection of the network connectivity status to terminate a plurality of sessions associated with the UE. Communication of the BSF and at least one NAF responsive to detection of the network connectivity status to terminate a plurality of sessions associated with the UE may include communicating between the BSF and the at least one NAF responsive to detection of the network connectivity status to invalidate authentication keys associated with the plurality of sessions. Communicating between the BSF and the at least one NAF responsive to detection of the network connectivity status to terminate a plurality of sessions associated with the UE may include communicating between the at least one NAF and a plurality of Service Providers to terminate the plurality of sessions.

In further exemplary embodiments, an IMS network includes at least one NAF configured to support a plurality of sessions with UE and a BSF configured to detect a network connectivity status of the UE and to communicate with the at least one NAF responsive to detection of the network connectivity status to terminate the plurality of sessions. The BSF may be configured to detect the network connectivity status of the UE and to communicate with the at least one NAF responsive to detection of the network connectivity status to invalidate authentication keys associated with the plurality of sessions.

Further exemplary embodiments provide a computer program product for operating an IMS network. The computer program product may include computer program code embodied in a computer-readable medium, the computer program code including program code configured to detect a network connectivity status of User Equipment (UE) and program code configured to cause communications between a Bootstrapping Server Function (BSF) and at least one Network Application Function (NAF) responsive to detection of the network connectivity status to terminate a plurality of sessions associated with the UE.

Other systems, methods, and/or computer program products according to exemplary embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments may be embodied as methods, electronic devices, and/or computer program products. Accordingly, the exemplary embodiments may be embodied in hardware and/or in software (including firmware, resident software, micro-code, etc.). Furthermore, the exemplary embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

As used herein, the term "User Equipment (UE)" refers to a terminal or device that may communicate with an IMS network. For example, UE may refer to devices that communicate using Session Initiation Protocol (SIP) via a media gateway, which translates communications, for example, between an IP network and another network, such as the public switched telephone network or a circuit switched wireless network. As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

Exemplary embodiments are described hereinafter with reference to message flow, flowchart and/or block diagram illustrations of methods, devices, and/or computer program products. These message flow, flowchart and/or block diagrams further illustrate exemplary operations for operating a communication network in which identity authentication, such as the identity of an end user, is provided in addition to UE or device level authentication. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Some embodiments arise from a realization that UE may have multiple sessions active in an IMS network at a given time. When the UE powers down or otherwise ends connectivity with the network, these multiple sessions may be left hanging, thus tying up system resources and potentially creating security vulnerabilities. While authentication keys for these sessions may have expiration times, the expiration times may be undesirably long and nonuniform depending, for example, on when the sessions were initiated and the nature of the sessions. According to various embodiments, a multi-session termination procedure utilizing bootstrapping architecture components may be used to tear down such sessions in a coordinated fashion responsive to, for example, a termination message from the UE and/or a timeout detected by the network.

Figure 3:
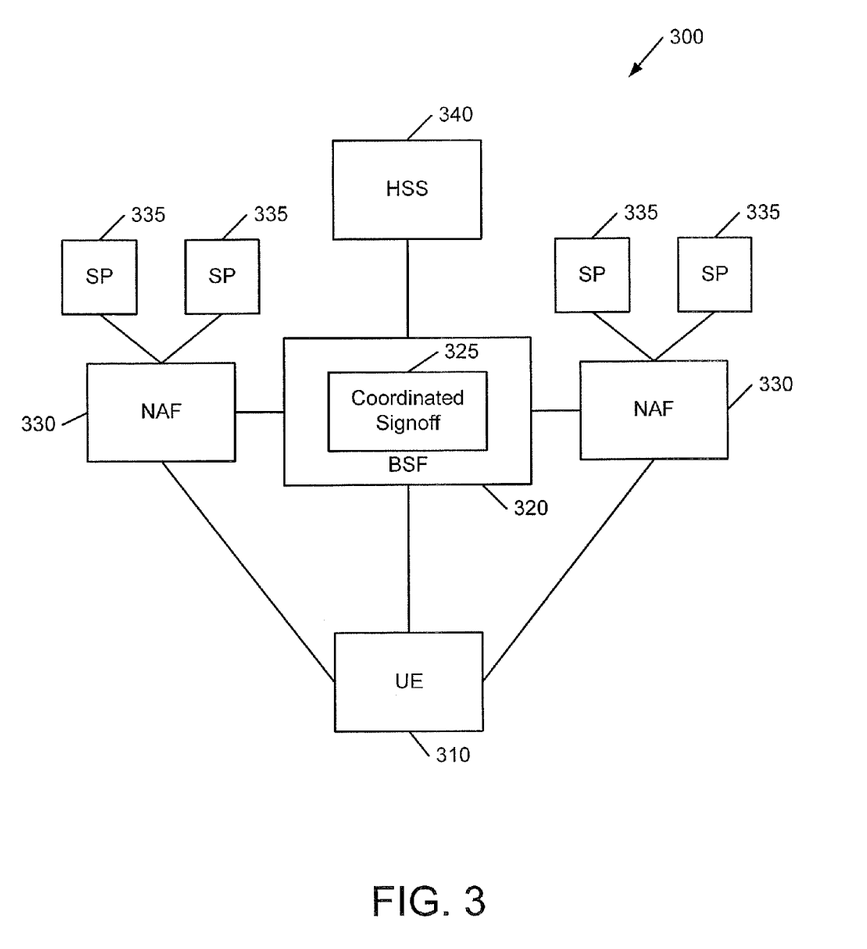
FIG. 3 is a schematic diagram illustrating an IMS network according to some exemplary embodiments.

FIG. 3 illustrates an IMS network 300 according to some exemplary embodiments. The IMS network 300 includes a Bootstrapping Server Function (BSF) 320, a Home Subscriber System (HSS) 340 and one or more Network Application Functions (NAFs) 330 that control sessions between UE 310 service providers (SPs) 335. The BSF 320, HSS 340, NAFs 330 and UE 310 may participate in a GBA authentication protocol in which shared key material is generated between the UE 310 and the network by running a GBA bootstrapping procedure. As illustrated, the BSF 320 includes a coordinated session termination function 325 that provides for termination of sessions of UE 310 with the SPs 335.

Figure 4:
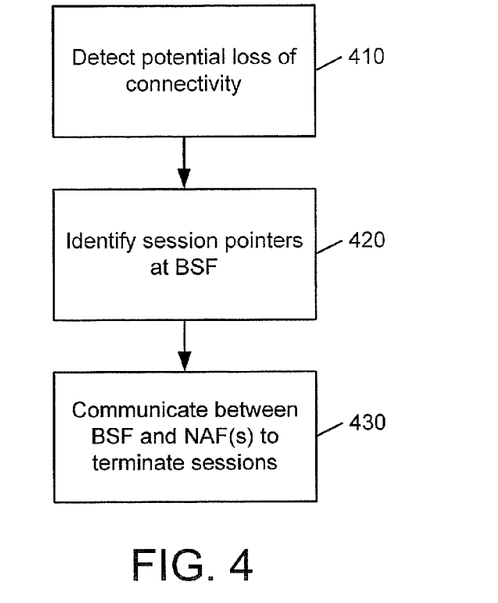
FIGS. 4-7 are flowcharts illustrating exemplary operations of the IMS network of FIG. 3 according to further exemplary embodiments.

FIG. 4 illustrates exemplary operations of the network 300 for coordinated session termination according to some exemplary embodiments. The network 300 detects a potential loss of connectivity with the UE 310 (block 410). In response, the BSF 320 identifies session pointers associated with the UE 420 (block 320). Based on the identified session pointers, the BSF 320 communicates with the NAFs 330 to terminate the sessions, e.g., by informing the NAFs 330 that the keys associated with these sessions are no longer valid, at block 430.

Figure 5:
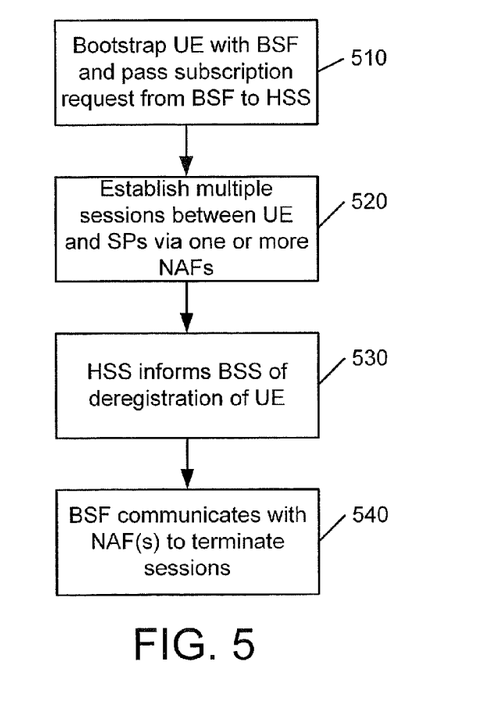

The manner in which coordinated session termination is triggered may vary. For example, in exemplary embodiments illustrated in FIG. 5, the UE 310 is bootstrapped with BSF 320, which passes a subscription request to HSS 340 that the BSF be informed of the registration status of the UE 310 (block 510). The UE 310 may establish multiple sessions via one or more of the NAFs 330 (block 520). When the UE 310 powers down, a request to deregister is passed to the HSS 340, which responsively informs the BSF 320 of the deregistration (block 530). In response, the BSF 320 communicates with the one or more NAFs 330 to tear down the sessions associated with the UE 310 (block 540).

Figure 6:
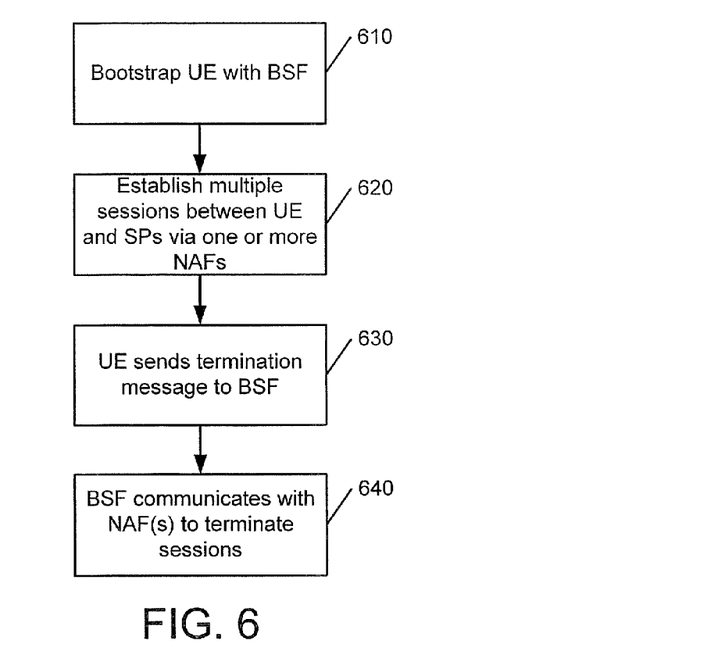

A variation of such operations according to further embodiments is illustrated in FIG. 6. The UE 310 is bootstrapped with BSF 320 (block 610). The UE 310 may establish multiple sessions via one or more of the NAFs 330 (block 620). When the UE 310 powers down, it first sends a termination message to the BSF 320 (block 630). In response, the BSF 320 communicates with the one or more NAFs 330 to tear down the existing sessions (block 640).

Figure 7:
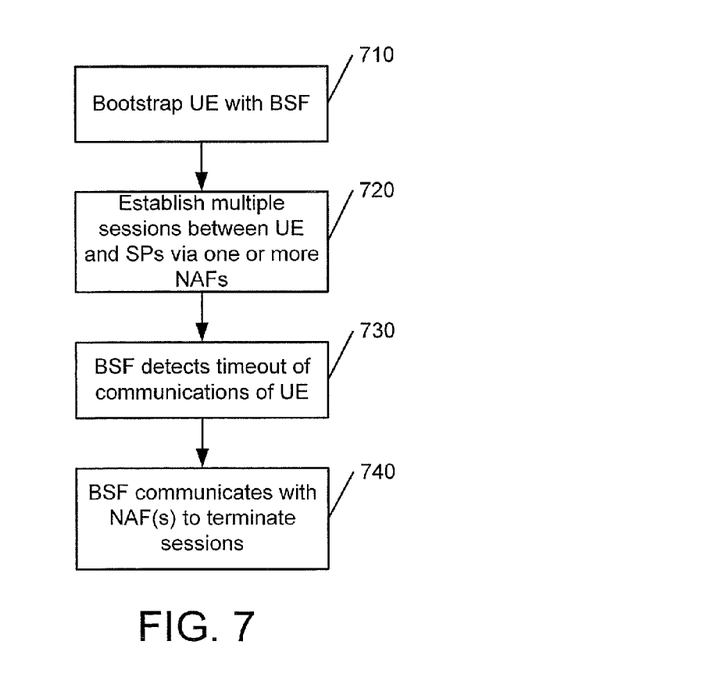

In further embodiments, coordinated session teardown may be initiated to other events indicating potential loss of connectivity. For example, referring to FIG. 7, in some embodiments the UE 310 is bootstrapped with BSF 320 (block 710). The UE 310 may establish multiple sessions with SPs 335 via one or more of the NAFs 330 (block 720). The BSF 320 detects timeout of communications between the UE 310 and the network 300 (block 730). For example, expiration of an implementation-specific timer, e.g., a timer at a network, link layer, session layer or application layer, may be detected. In response, the BSF 320 communicates with the one or more NAFs 330 to tear down any remaining sessions (block 740).

Figure 8:
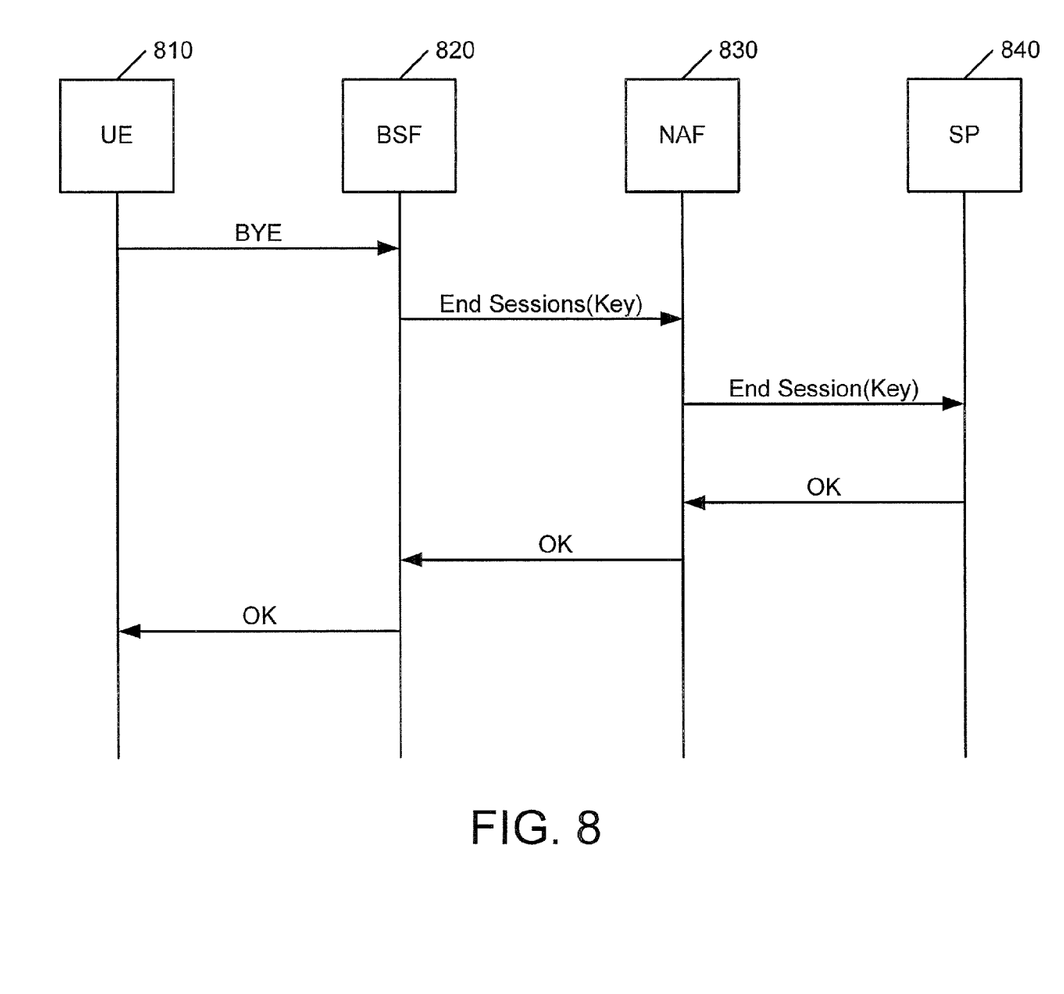
FIG. 8 is a message flow diagram illustrating an IMS network and operations thereof according to still further exemplary embodiments.

FIG. 8 illustrates an exemplary message flow that may support coordinated session teardown according to some embodiments. At, for example, user selection of power-down, UE 810 may transmit a SIP BYE (or CANCEL) message to a BSF 820. In response, the BSF 820 identifies session pointers associated with the UE 810 and sends a message instructing a NAF 830 supporting one or more sessions to invalidate the authentication keys associated therewith. In turn, the NAF 830 identifies a session pointer for an SP 840 associated with the UE 810, and sends a message to the SP 840 to render the keys invalid. Acknowledgment messages may then be propagated from the SP 840 to the UE 810 via the NAF 830 and the BSF 820.

Many variations and modifications can be made to the embodiments without substantially departing from the principles of the present invention. All such variations and modifications are intended to be included herein within the scope of the present invention, as set forth in the following claims.

That which is claimed:

1. A method of operating an internet protocol multimedia subsystem network, the method comprising:
   detecting a network connectivity status of user equipment, the network connectivity status corresponding to a session between the user equipment and a service provider, the detecting the network connectivity status of the user equipment comprising detecting termination of network connectivity of the user equipment responsive to a communication to the internet protocol multimedia subsystem network by the user equipment and receiving a termination message from the user equipment at a bootstrapping server function;
   identifying multiple session pointers associated with the user equipment via the bootstrapping server function;
   sending a message from the bootstrapping server function to a network application function instructing the network application function to invalidate authentication keys associated with the multiple session pointers associated with the user equipment;
   sending a message from the network application function to the service provider to terminate sessions between the user equipment and the service provider that are associated with the multiple session pointers and to invalidate the authentication keys; and
   propagating acknowledgement messages from the service provider to the user equipment via the network application function and the bootstrapping server function responsive to receiving the message from the network application function to terminate sessions between the user equipment and the service provider that are associated with the multiple session pointers and to invalidate the authentication keys.

2. The method of claim 1, wherein the detecting of the network connectivity status of the user equipment comprises receiving notification of de-registration of the user equipment from a home subscriber server.

3. The method of claim 1, wherein the detecting of the network connectivity status comprises detecting a loss of communications between the user equipment and the network.

4. The method of claim 3, wherein the detecting of the loss of communications between the user equipment and the network comprises detecting a communications timeout.

5. A computer program product for operating an internet protocol multimedia subsystem network, the computer program product comprising a non-transitory computer-readable medium having computer readable program code that when executed by a processor causes the processor to perform operations comprising:
   detecting a network connectivity status of user equipment, the network connectivity status corresponding to a session between the user equipment and a service provider, the detecting the network connectivity status of the user equipment comprising detecting termination of network connectivity of the user equipment responsive to a communication to the internet protocol multimedia subsystem network by the user equipment and receiving a termination message from the user equipment at a bootstrapping server function;
   identifying multiple session pointers associated with the user equipment via the bootstrapping server function;
   sending a message from the bootstrapping server function to a network application function instructing the network application function to invalidate authentication keys associated with the multiple session pointers associated with the user equipment;
   sending a message from the network application function to the service provider to terminate sessions between the user equipment and the service provider that are associated with the multiple session pointers and to invalidate the authentication keys; and
   propagating acknowledgement messages from the service provider to the user equipment via the network application function and the bootstrapping server function responsive to terminating receiving the message from the network application function to terminate sessions between the user equipment and the service provider that are associated with the multiple session pointers and to invalidate the authentication keys.

6. The computer program product of claim 5, wherein the detecting the network connectivity status comprises detecting a loss of communications between the user equipment and the network.

* * * * *